United States Patent

Pollard et al.

[11] Patent Number: 5,976,662
[45] Date of Patent: Nov. 2, 1999

[54] JOINT DISC MADE OF A FIBER COMPOSITE MATERIAL

[75] Inventors: Andrew Pollard, Bridgnorth; Russel Osborn, Birmingham, both of United Kingdom; Wolfgang Löbel, Frankfurt; Ludger Schachtrup, Münster, both of Germany

[73] Assignee: GKN Automotive AG, Lohmar, Germany

[21] Appl. No.: 09/026,870

[22] Filed: Feb. 20, 1998

[30] Foreign Application Priority Data

Feb. 22, 1997 [DE] Germany ............................ 197 07 138

[51] Int. Cl.[6] ............................................ F16D 3/78
[52] U.S. Cl. ............................................ 428/66.6; 464/93
[58] Field of Search .................... 428/66.6; 464/93, 464/69

[56] References Cited

U.S. PATENT DOCUMENTS

| | | | |
|---|---|---|---|
| 1,409,611 | 3/1922 | Stokes | 464/69 |
| 5,163,876 | 11/1992 | Zilberman et al. | 464/69 |
| 5,286,231 | 2/1994 | Zilberman et al. | 464/93 |
| 5,295,912 | 3/1994 | Muller et al. | 464/93 |
| 5,338,259 | 8/1994 | Lobel | 464/93 |

FOREIGN PATENT DOCUMENTS

| | | |
|---|---|---|
| 2001376 | 7/1971 | Germany . |
| 2257903 | 6/1974 | Germany . |
| 3725957 | 3/1989 | Germany . |
| 2249157 | 4/1992 | United Kingdom . |
| 9201873 | 2/1992 | WIPO . |

*Primary Examiner*—Alexander Thomas

[57] ABSTRACT

A joint disc made of a fiber composite material with a plurality of flexible leaf elements and a plurality of angular fixing elements which are composed of laminations of fiber composite material, with the leaf elements, at each of their ends, having an increasing thickness extending at least over 10% of their length.

12 Claims, 5 Drawing Sheets

JOINT DISC MADE OF A FIBER COMPOSITE MATERIAL

BACKGROUND OF THE INVENTION

The invention relates to a flexible coupling element or joint disc (which latter term is used herein for convenience) made of laminations of a fiber composite material and comprising an even number of angular fixing elements spaced about the disc and a plurality of flexible leaf elements extending circumferentially therebetween.

The leaf elements may be straight so the disc is generally in the form of a polygon. In a basic design of joint discs of the aforesaid type, it is made of superimposed laminations which, in outline, each extend over one leaf element and two adjoining fixing elements. Layering a plurality of said leaf elements in the shape of a polygon thus leads to fixing elements of double thickness relative to the leaf elements because the former contain double the number of superimposed laminations as compared to the latter. The laminations comprising fabric impregnated with resin, each have a main fiber orientation which may vary between the individual laminations. In the central layers of laminations within the leaf elements the main fiber orientation may coincide with the longitudinal direction of the laminations, whereas the outer layers may comprise alternately opposed angles of intersection of the main fibre orientation relative to the longitudinal direction of the leaf element.

Joint discs or shaft coupling elements of this type used for connecting two shafts and suitable for relatively limited angles of articulation between the shafts are known from DE-3725957-C1 and DE-4033596-C1. Flange parts of the two shafts be coupled are circumferentially alternately bolted to the fixing elements of the joint disc, which are provided with bolt holes. Whereas the fixing elements and reinforced eye regions thereof around the bolt holes respectively can be regarded as substantially rigid, the leaf elements or web regions therebetween, in the case of shafts articulated relative to one another, are bent in the form of an S-wave on which are superimposed forces due to torsion. To reduce load peaks the former publication DE-3725957-C1 already proposes to provide the transition between the web regions and eye region with radii; in DE-4033596-C1 it is proposed—again in order to reduce load peaks—to position the fixing holes radially inwardly with reference to the longitudinal center lines of the web region. Furthermore, the previously mentioned shaft coupling elements are limited to relatively small operating angles. An important factor continues to be load peaks in the case of shafts which are angled relative to one another, i.e. load peaks in the regions of transition between leaf elements and fixing elements.

It is therefore the object of the present invention to improve a joint disc of the initially mentioned type in such a way as to permit larger operating angles when using a joint disc of a predetermined size, i.e. of a certain diameter.

SUMMARY OF THE INVENTION

According to the invention, it is provided that the leaf elements, at each of their ends, have an increasing thickness extending at least over 10% of their length. In an advantageous embodiment, it is proposed that the leaf elements, at each of their ends, have an increasing thickness extending over up to 30% of their length towards the fixing elements.

The above-described means make it possible to reduce the load peaks which lead to damage when a certain operating angle is exceeded; they thus permit larger operating angles. The forces required for articulating the joint disc increase only slightly and can, as a rule, be accommodated by the shaft bearing without having to introduce any special measures.

According to a particularly advantageous embodiment it is further proposed that the leaf elements, at each of their ends may have a decreasing width (which is their dimension in the direction generally radially of the disc, transversely to their lengths) extending at least over 10% of their length. According to a further advantageous embodiment, the leaf elements, at each of their ends, may have a decreasing width extending over up to 30% of their length.

In the embodiment proposed here, the decreasing width at the end regions represents a corrective measure for the increasing thickness of the end regions. It is thus possible, effectively, to reduce the load peaks without substantially stiffening the leaf elements. In view of the shear and tensile forces to be transmitted by the leaf elements, this embodiment achieves quasi-isotropic load conditions. The material is loaded uniformly up to the permissible load limits.

The proposed shape of a decreasing width of the end regions of the leaf elements, which can continue in a straight line into the fixing elements, has a further advantage in that the overall diameter of the joint disc element may be reduced, in that the outer edges of the polygon may be cut.

In a plan view, the leaf elements can preferably be structured in such a way that they are offset outwardly by a certain amount relative to the respective connecting line between the adjoining through-holes in the fixing elements. The structure in respect of the central plane is preferably symmetric.

As far as the technical realization of the increasing thickness of end regions of the leaf elements is concerned, different embodiments will be proposed below.

To achieve the required graduation of the thickness of the leaf elements, it is proposed according to a first embodiment to provide laminations of a stepped length in respect of one another, which laminations are incorporated into the fixing elements and extend over different distances into the adjoining leaf elements for the purpose of forming the end portions with an increasing thickness.

According to a second embodiment it is proposed that there may be provided lamination which are of a stepped length in respect of one another, which are incorporated into the leaf elements and which extend over different distances beyond the adjoining fixing elements for the purpose of forming the end portions of an increasing thickness. The differently sized laminations are preferably incorporated especially symmetrically relative to the central plane of the joint disc.

In accordance with the design mentioned fist, there are thus used additional laminations which are combined with laminations known in themselves. Such additional laminations, which are stepped in length relative to one another, in particular, can be pressed into wedge elements in an intermediate manufacturing stage, which wedge elements are inserted in the region of the fixing elements between the laminations of corresponding outlines. In accordance with the second embodiment, there are used laminations which are stepped relative to one another and which greatly contribute towards forming the leaf elements themselves, and which each extend beyond the adjoining fixing elements into the end regions of the adjoining leaf elements, the advantage of this design being the possibility of reducing the total number of individual parts to be used.

The preferred number of laminations in the leaf elements is ten, with the fiber of approximately half of same, i.e.

preferably of the inner six laminations, mainly extending in the direction of the leaf elements, whereas especially the four outer laminations can comprise fibers extending at different angles relative to the longitudinal direction of the leaf elements.

If wedges are inserted, these, in a suitable embodiment, may be built up of six differently sized individual laminations, with two or four of such wedges having to be inserted symmetrically between the other laminations which also form the leaf elements.

The differences between the individual laminations as regards their length relative to their thickness should be such that, overall, the increase in thickness of the end regions is described by an angle of 1° to 6° on both sides relative to the central plane of the leaf elements.

Reinforcing rings may be placed on the fixing elements on both sides so as to extend concentrically relative to the bolt holes, with said reinforcing rings being pressed jointly with the laminations for the purpose of forming reinforcing eyes to prevent the joint disc from being damaged when being bolted to the alternate flanges.

BRIEF DESCRIPTION OF THE DRAWINGS

The invention will not be described by way of example with reference to the accompanying drawings of which.

a) in an axial plan view b) in a cross-section.

Figure 2:
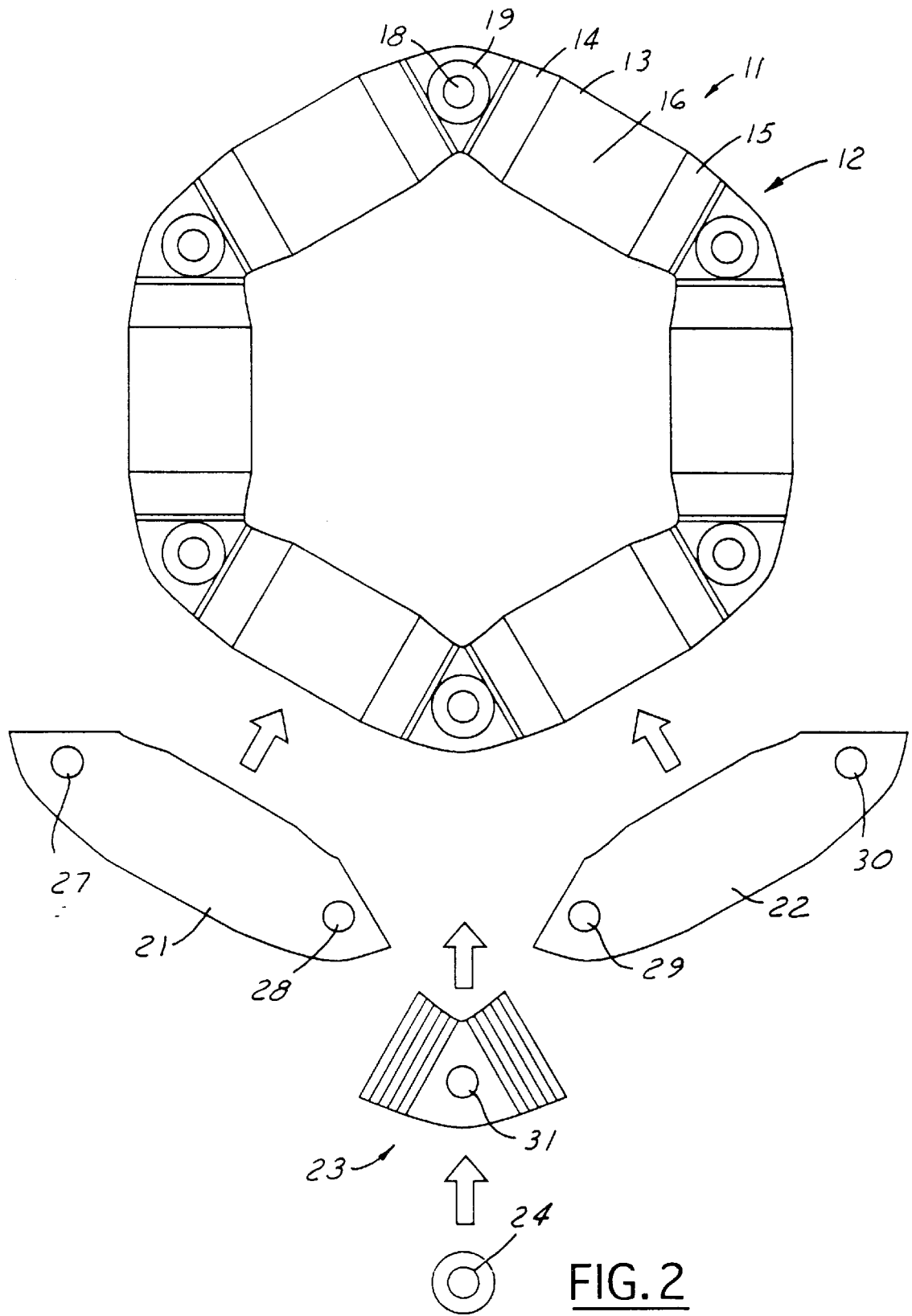
FIG. 2 shows a joint disc according to FIG. 1a, giving design details in a first embodiment.

FIG. 5 shows a flange element as appearing in FIG. 2 in the form of a cut-out in an enlarged scale a) in an axial plan view b) in a longitudinal section through the finished product c) in a longitudinal section prior to pressing the individual parts.

DETAILED DESCRIPTION OF THE DRAWINGS

Below, FIGS. 1a, 1b, 1c will first be described together. In an axial plan view, the joint disc according to the invention forms a hexagon which is composed of leaf elements 11 whose ends lie at right angles relative to their longitudinal direction and of fixing elements with ends inclined to one another to force the leaf elements 12. The leaf elements each comprise central portions 13 which comprise a substantially constant thickness and which, at both ends, are adjoined by end portions 14, 15 whose thickness increases towards their ends. In the embodiment shown, the width of the end portions 14, 15 decreases approaching the fixing elements. The leaf elements 13 each are slightly outwardly staggered with reference to a connecting line 16 between adjoining through-holes 18 in the fixing elements, as can be seen in the axial view, but they are substantially symmetric with reference to a central plane 17, as can be seen in the enlarged detail which is FIG. 1c. Relative to the leaf elements 11, the fixing elements 12 comprise a greater and substantially constant thickness, so that they can be regarded as being substantially rigid. In the fixing elements 12, there are arranged the through-holes 18 by means of which the fixing elements can be circumferentially alternately connected to flange parts of the shafts to be connected. Around the through-holes 18 there are provided reinforced eye regions 19. The end portions 14, 15 each take up approximately 20% of the total length of a leaf element 11. Starting from the central portion 13, the thickness increases steplessly and substantially constantly, with the increase in thickness being described by an angle which, on both sides, ranges between 1° and 6° relative to the central plane 17. In the connecting region between the end portions 14, 15 and the fixing elements 12 there are provided transition radii 20.

Figure 1A:
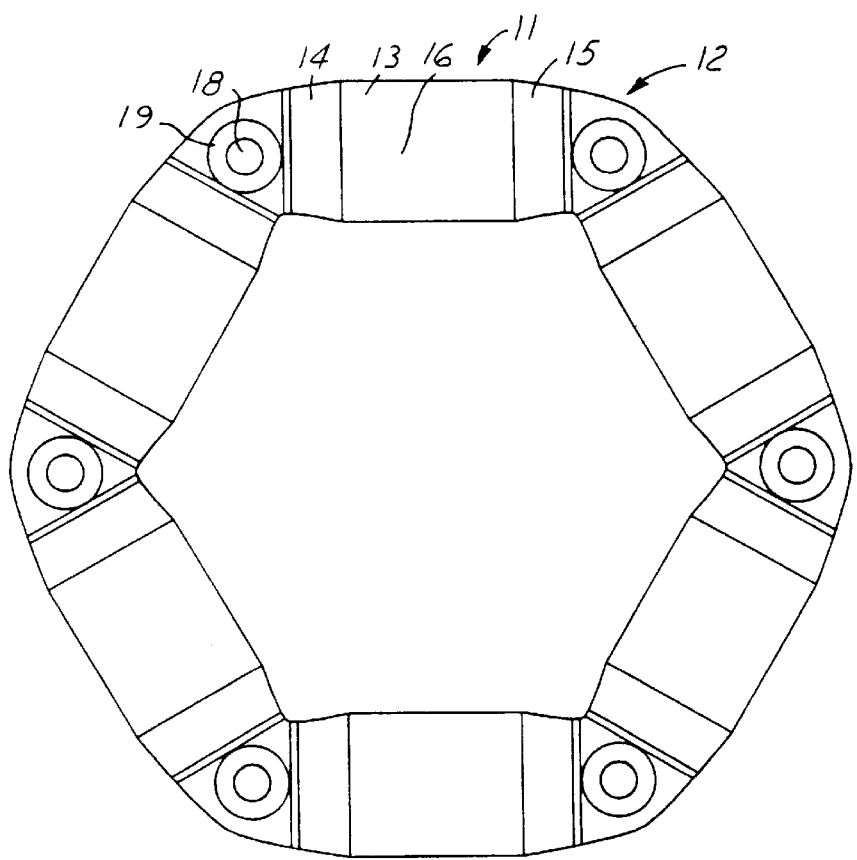
FIG. 1 shows a joint disc in accordance with the invention a) in an axial plan view b) in a cross-section c) in the form of a detail of FIG. 1b in an enlarged scale.
Figure 1B:
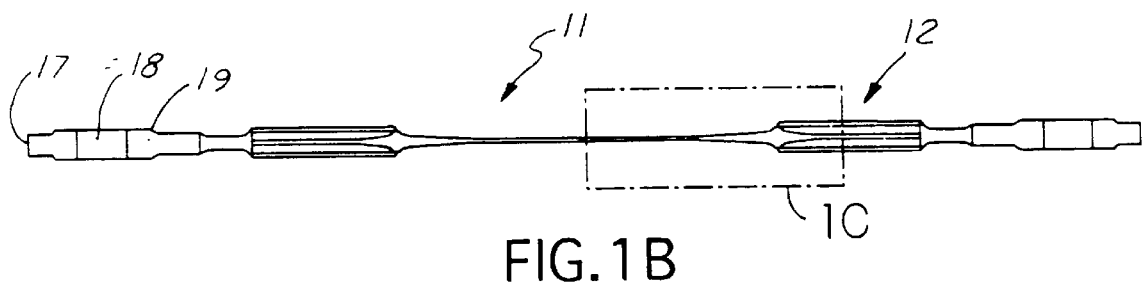
Figure 1C:
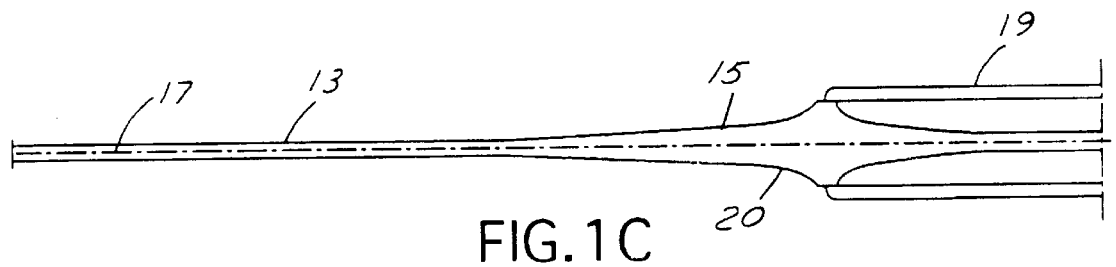

The top half of FIG. 2 shows a joint disc as illustrated in FIG. 1a, with corresponding details having been given the same reference numbers. To that extent, reference is made to the description of FIG. 1. Below the joint disc there are shown laminations 21, 22 which have identical shapes and are associated with two adjoining leaf elements. The shape of each of said laminations is such that they cover the outlines of a leaf element and two adjoining fixing elements. By layering laminations 21, 22 in a way as indicated by arrows, there are obtained leaf elements 11 which comprise a first number of laminations and thus a first thickness and fixing elements 12 which comprise double the number of laminations and thus double the thickness. Furthermore, below the lower central fixing element 12 there is shown a wedge element 23 which, in turn, as can be seen in two groups of edges, is composed of a plurality of differently sized layered individual laminations. The individual laminations which decrease in size from the bottom to the top form a wedge element 23 whose thickness increases towards the center. The largest individual lamination, in outline, covers a fixing region 12 and two adjoining end portions 14, 15, whereas the smallest lamination positioned at the top, in outline, only covers the fixing element as such. By inserting at least one wedge element 23 between individual laminations 21, 22, there are formed end portions 14, 15 of an increasing thickness. The laminations 21, 22 and the wedge element 23 are provided with punched holes 27–31 which, at a later stage, will form the reinforcing holes 18. Furthermore, in the form of a detail, there is shown a reinforcing ring 24 which forms reinforcing eyes 19 for the bolt holes 18. After the individual parts forming the entire polygon have been placed one above the other, the layered laminations are pressed under the influence of heat.

Figure 3:
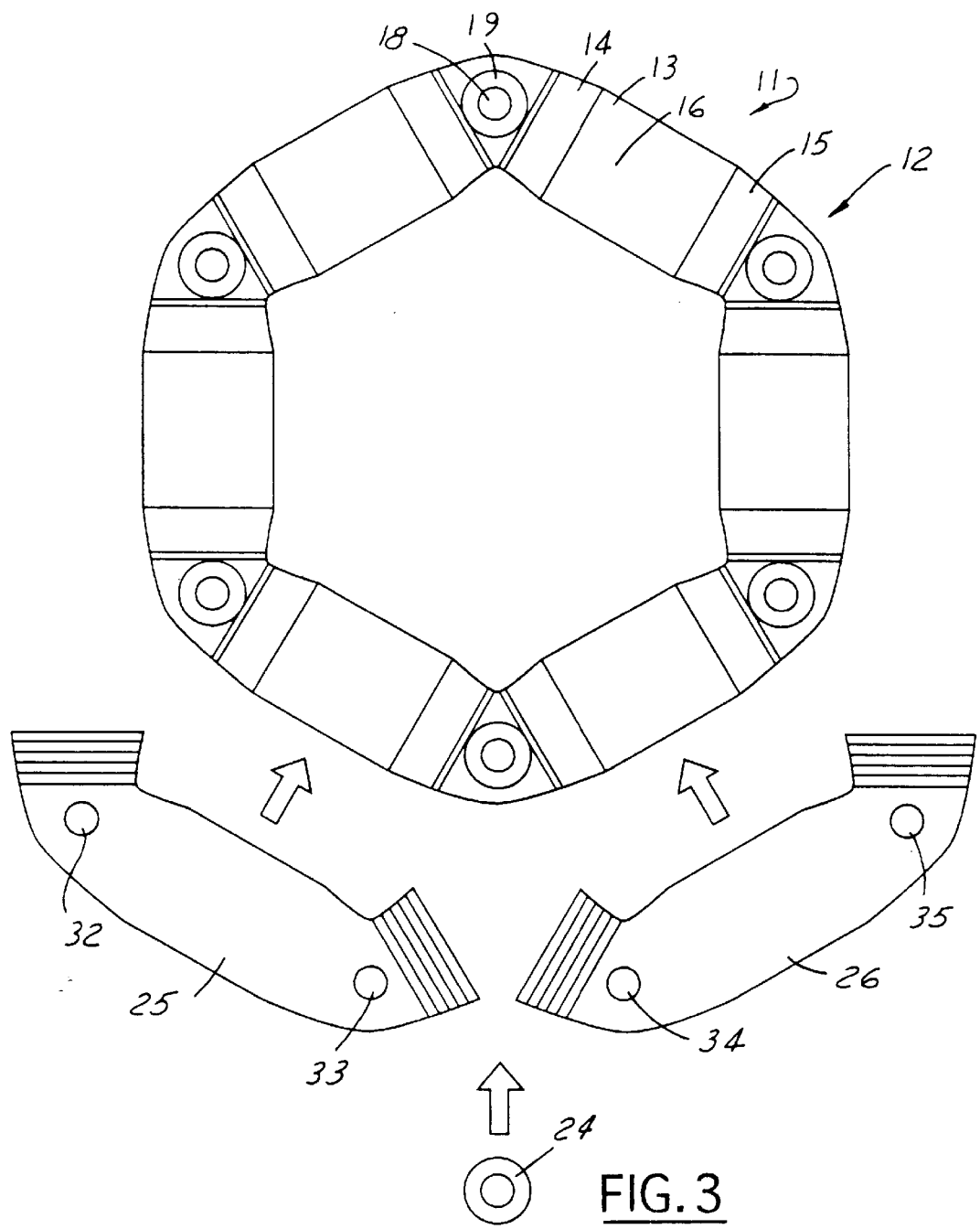
FIG. 3 shows a joint disc according to FIG. 1a, giving design details in a second embodiment.

The top half of FIG. 3 shows a joint disc as illustrated in FIG. 1a, with corresponding details having been given the same reference numbers. To that extent, reference is made to the description of FIG. 1a. Below the joint disc there are shown lamination packages 25, 26 which, in outline, each extend over a leaf element 11 and two adjoining fixing elements 12. As shown by groups of edges at their ends, the lamination packages are composed of laminations of different lengths, the lowermost lamination covering two adjoining fixing regions and the end portions of the adjoining leaf elements, whereas the uppermost lamination covers only one leaf element and two adjoining fixing elements. If a plurality of such lamination packages 25, 26 are placed one above the other in a way as indicated by arrows, there are obtained leaf elements 11 with end portions 14, 15 of an increasing thickness, similarly to the design of the joint disc according to FIG. 2.

In the lamination packages 25, 26 there are provided punched holes 32–35 which, at a later stage, form the bolt holes 18. Furthermore, there is shown a reinforcing ring 24 which forms the reinforcing eyes 19 for the bolt holes 18. Whereas in the above description, the lamination packages 25, 26 are described as units, it is also possible to position the individual laminations of both lamination packages alternately one above the other, thus achieving a groove-like engagement between the individual laminations in the region of the fixing elements 12.

Figure 4A:
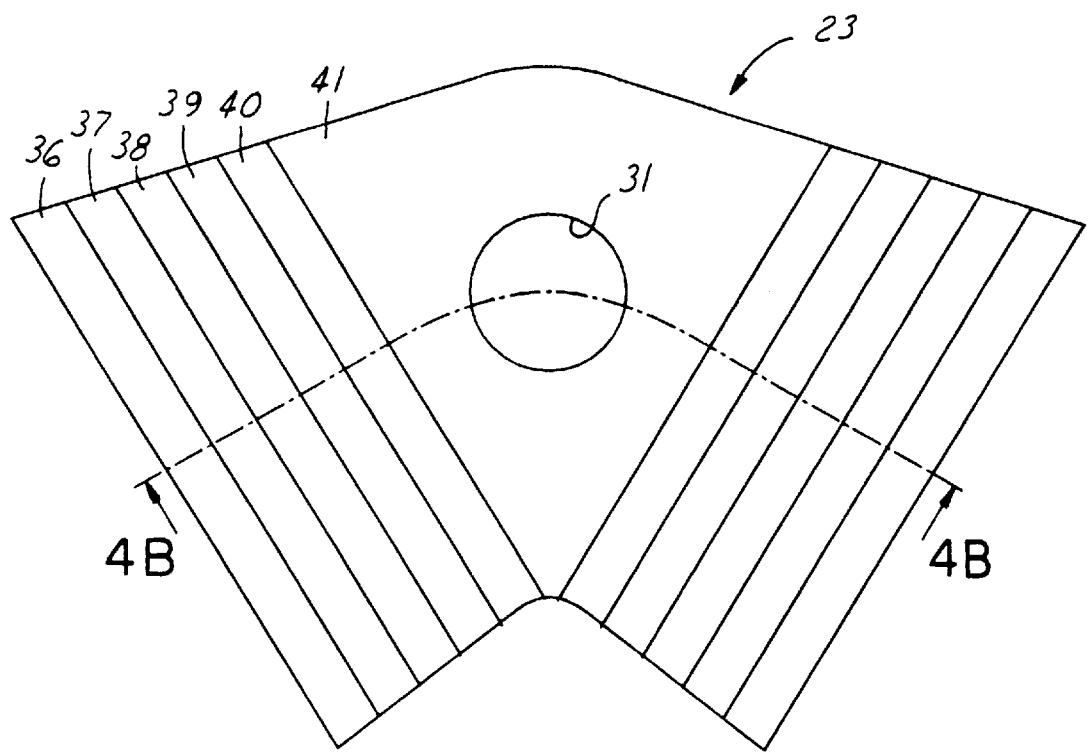
FIG. 4 shows a wedge element as appearing in FIG. 2 in the form of an individual part in an enlarged scale.
Figure 4B:
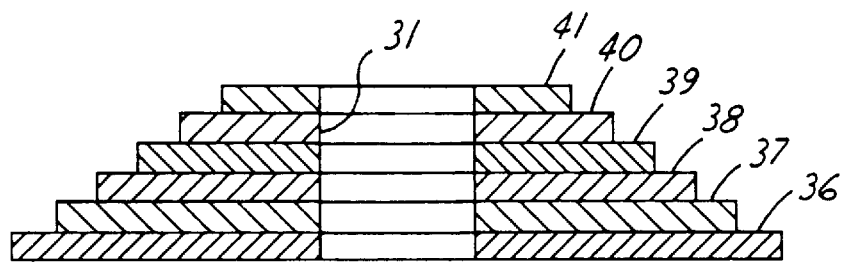

A wedge element 23 according to FIG. 2 showing in the form of a detail, with FIG. 4a showing an axial view and FIG. 4b a sectional view along the sectional line given in FIG. 4a. It can be seen that the wedge element consists of six laminations 36, 37, 38, 39, 40, 41 which decrease in size from the bottom to the top and which are each punched in such a way that they jointly form the bolt hole 31. To ensure a symmetric composition of the end portions 14, 15, first two wedge elements 23 have to be integrated in a fixing element 12. The thickness of the illustrated laminations relative to their size is shown in FIG. 4b before they are pressed into a finished wedge element.

Figure 5A:
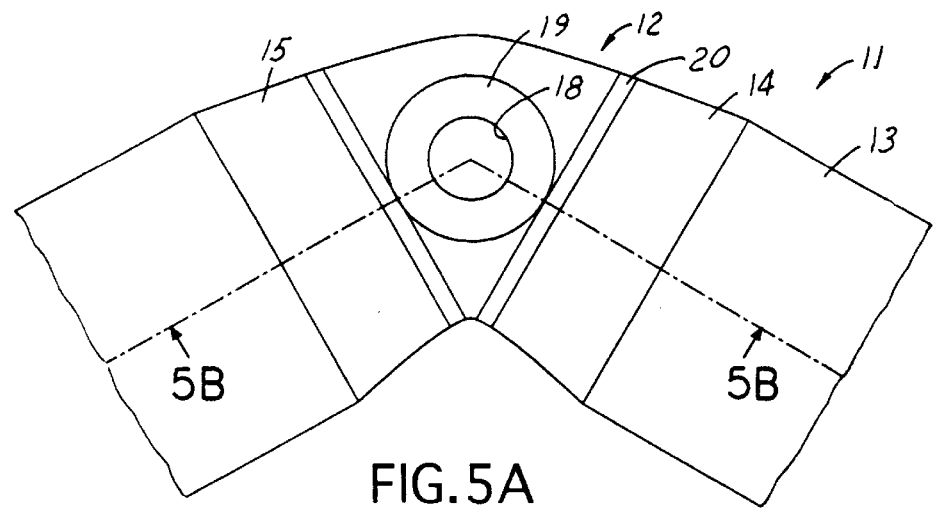
Figure 5B:
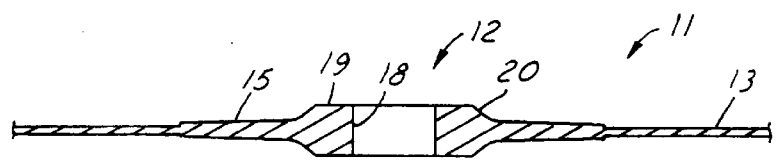
Figure 5C:
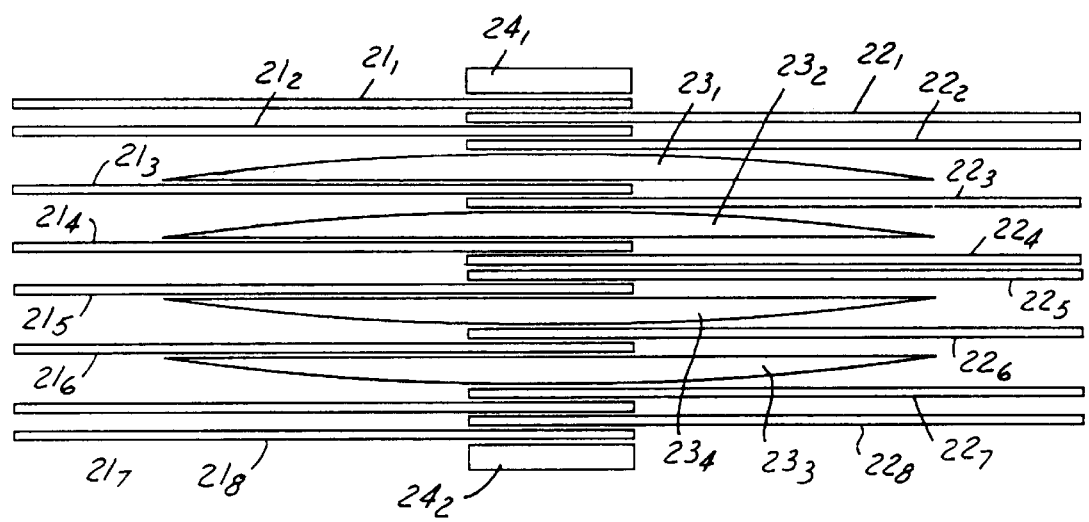

FIGS. 5a–c show a fixing element 12 according to FIG. 2, with the reference numbers being the same as those given in FIG. 2. To that extent, reference is made to the description of FIG. 2. FIG. 5c shows the individual parts in the form of a fixing element 12 and adjoining end portions 14, 15 of a leaf element 11 prior to being pressed, with four wedge elements $23_1, 23_2, 23_3, 23_4$ already finish-pressed being arranged symmetrically between a plurality of laminations $21_1, 21_8, 22_1$–$22_8$, and with reinforcing rings $24_1, 24_2$ being placed on to each of the outer laminations. The laminations $21_1$–$21_8$, $22_1$–$22_8$, in respect of their outline, correspond to those shown in FIG. 2. However, normally they differ in that the fibers of the fiber reinforcement extend in different directions. In particular, the fibers of centrally arranged laminations extend in the longitudinal direction characterized by the center line 16, whereas the fibers of the outer laminations normally extend at varying angles relative to the center line 16. After the individual parts shown in FIG. 5c have been pressed, there is obtained a fixing element 12 with adjoining leaf elements 11 with end regions 14, 15 of an increasing thickness according to the illustration of FIG. 5b.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A joint disc made of laminations of a fiber composite material, said disc comprising an even number of angled fixing elements spaced around said disc and a plurality of flexible leaf elements, each of said leaf elements having respective ends at which it is connected to respective adjacent fixing elements and extending circumferentially of said disc between said adjacent fixing elements; and wherein each of said leaf elements at each of said ends has, extending over at least 10% of its length towards the respective adjacent fixing element, an increasing thickness and a decreasing width.

2. A joint disc according to claim 1, wherein said leaf elements are straight and said disc is generally polygonal.

3. A joint disc according to claim 1, wherein said leaf elements have an increasing thickness extending over up to 30% of their length at each of their ends.

4. A joint disc according to claim 1, where in said leaf elements fibers of central laminations extend in a longitudinal direction of said leaf element and fibers of outer laminations extend at an angle relative to said longitudinal direction of said leaf element.

5. A joint disc according to claim 1, wherein the increase in thickness in said end portions is such that opposite surfaces of said end portions each lie at an angle of 1° to 6° relative to a central plane of said leaf elements.

6. A joint disc according to claim 1 wherein each of said leaf elements, at each of said ends, has a decreasing width extending towards the respective adjacent fixing element up to 30% of its length.

7. A joint disc according to claim 1 wherein laminations are provided which are of a stepped length in respect of one another, which are incorporated into said fixing elements and which extend over different distances into said adjoining leaf elements, for the purpose of forming said end portions of an increasing thickness.

8. A joint disc according to claim 1 wherein each of said leaf elements includes, at each of said ends, laminations which are of a stepped length in respect of one another and which extend through the respective adjacent fixing elements and over different distances beyond said fixing elements into said adjacent leaf elements to form said end portions of increasing thickness in said adjacent leaf elements.

9. A joint disc according to claim 8 wherein wedge elements built up of different laminations of different lengths are incorporated into said fixing elements and extend into said adjoining leaf elements to form said end portions of an increasing thickness.

10. A joint disc made of laminations of a fiber composite material, said disc comprising an even number of angled fixing elements spaced around said disc and a plurality of flexible leaf elements, each of said leaf elements having respective ends at which it is connected to respective adjacent fixing elements and extending circumferentially of said disc between said adjacent fixing elements, and wherein each of said leaf elements, at each of its ends, has an increasing thickness extending over at least 10% of its length towards said fixing elements, said increasing thickness at said fixing elements provided by laminations which are of a stepped length in respect of one another and which extend over different distances into adjoining leaf elements.

11. A joint disc according to claim 10 wherein each of said leaf elements includes, at each of said ends, laminations which are of a stepped length in respect of one another and which extend through said respective adjacent fixing elements and over different distances beyond said fixing elements into adjacent leaf elements to form said end portions of increasing thickness in said adjacent leaf elements.

12. A joint disc according to claim 10 where wedge elements built up of different laminations of different lengths are incorporated into said fixing elements and extend into the adjoining leaf elements to form said end portions of an increasing thickness.

* * * * *